Oct. 21, 1947.   R. O. ANDERSON ET AL   2,429,253
APPARATUS FOR ABSORBING SHOCK LOADS
Filed Dec. 20, 1943   7 Sheets-Sheet 5

Inventors:
Rexford O. Anderson
and William E. Walsh,
By Dawson, Ormsby Barth,
Attorneys.

Oct. 21, 1947.   R. O. ANDERSON ET AL   2,429,253
APPARATUS FOR ABSORBING SHOCK LOADS
Filed Dec. 20, 1943   7 Sheets-Sheet 6
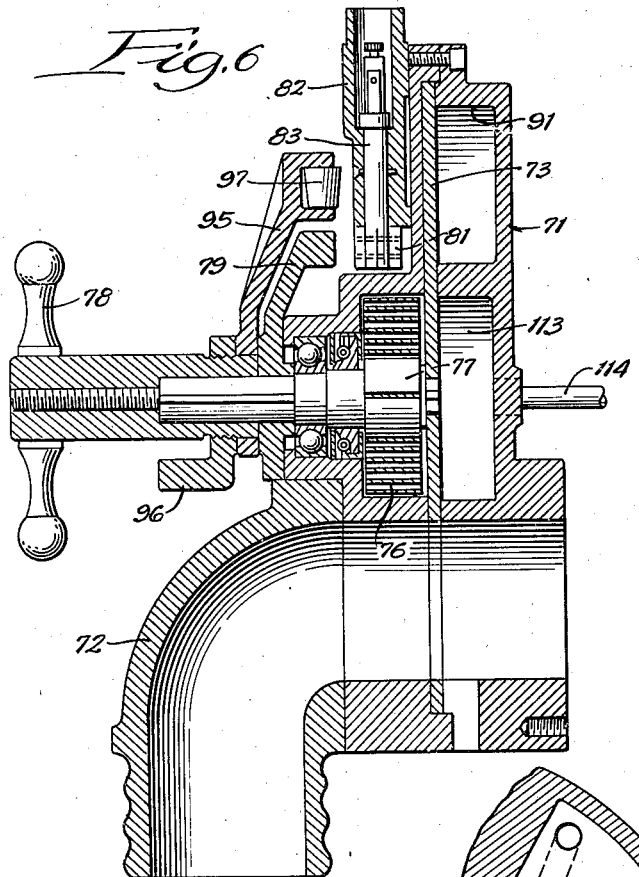
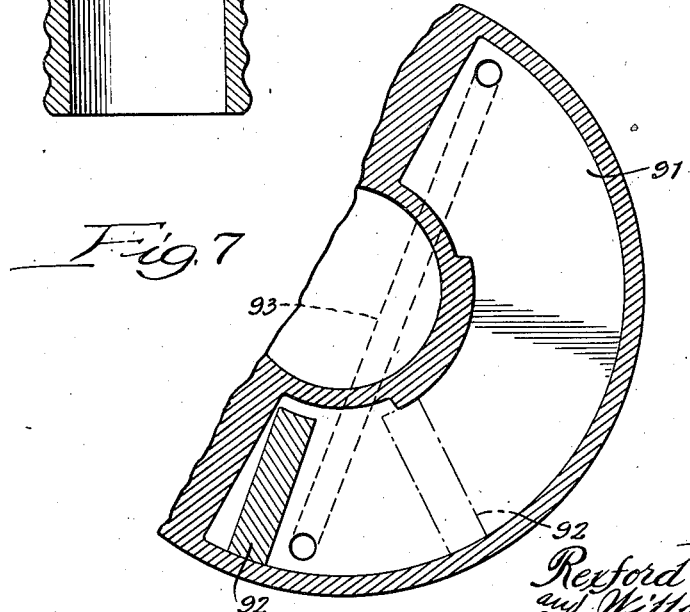
Inventors:
Rexford O. Anderson
and William E. Walsh,
By Dawson, Ooms & Birth
Attorneys.

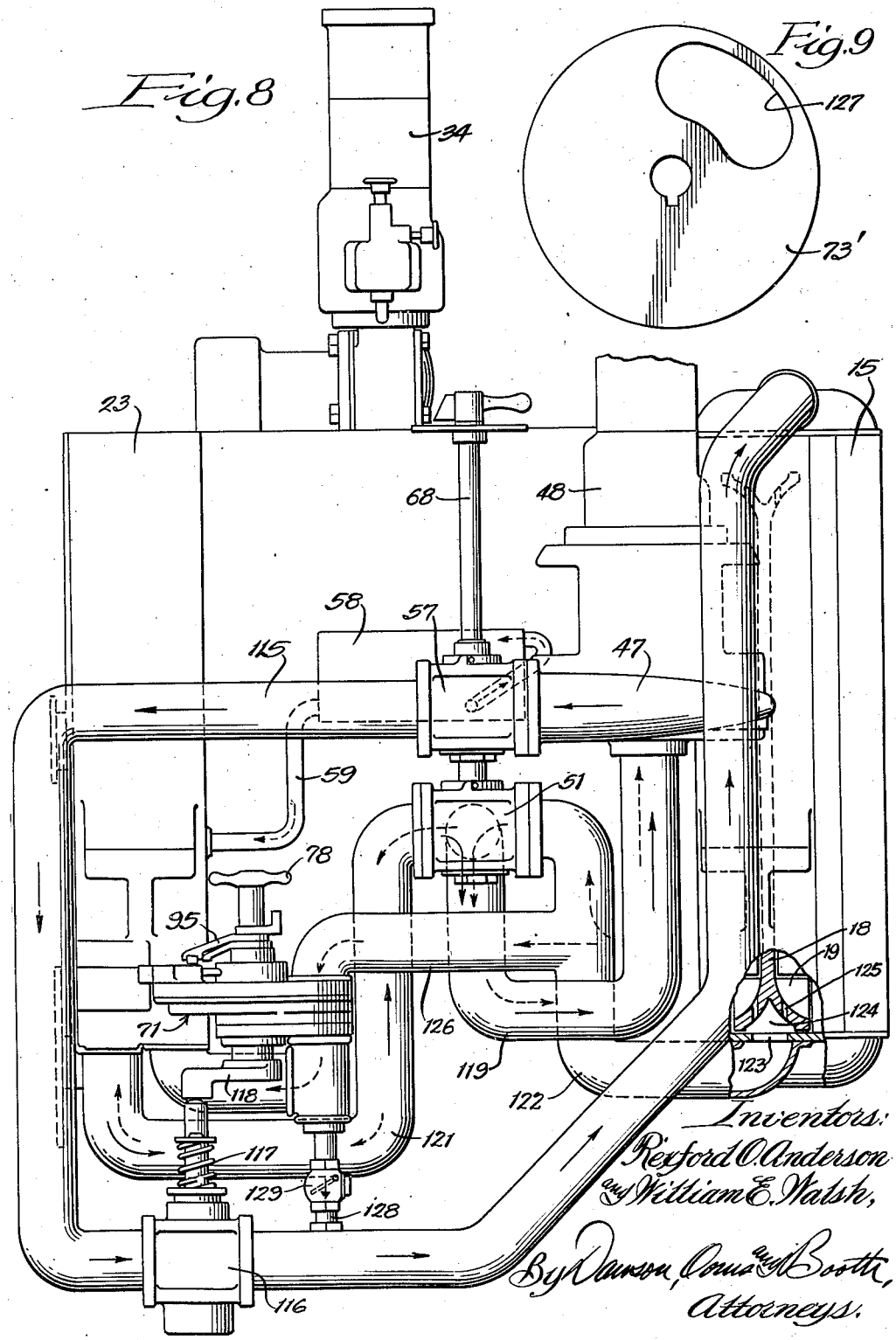

Patented Oct. 21, 1947

2,429,253

UNITED STATES PATENT OFFICE 2,429,253

APPARATUS FOR ABSORBING SHOCK LOADS

Rexford O. Anderson and William E. Walsh, Chicago, Ill., assignors to Foote Bros. Gear and Machine Corporation, Chicago, Ill., a corporation of Delaware Application December 20, 1943, Serial No. 515,000

16 Claims. (Cl. 244—3)

This invention relates to apparatus for absorbing shock loads and more particularly to apparatus adapted to be mounted in an aircraft to pick up loads from the ground when the aircraft is in motion.

One of the objects of the invention is to provide an apparatus which is light and compact and yet which is capable of absorbing large shock loads in a relatively short period of time.

Another object of the invention is to provide apparatus for absorbing shock loads in which the major portion of the load is absorbed hydraulically and the final part only is absorbed by a mechanical brake.

Still another object of the invention is to provide apparatus for absorbing shock loads including a hydraulic unit which is initially empty and which is supplied with fluid upon the application of a load.

A further object of the invention is to provide apparatus for absorbing shock loads in which fluid is supplied to a hydraulic unit in a plurality of successive steps to absorb the load smoothly and evenly.

A still further object of the invention is to provide an apparatus mounted in an aircraft in such a way that the operating parts are cooled during use and the controls to be handled by the operator are shielded from the atmosphere.

The above and other objects and advantages of the invention will be more readily apparent from the following description when read in connection with the accompanying drawings, in which—

Figure 6 is an enlarged section of the control valve;

Figure 7 is a partial section at right angles to Figure 6;

Figure 8 is a view similar to Figure 2 of an alternative construction; and

Figure 9 is a detail view of a control valve disc for use with Figure 8.

Figure 1:
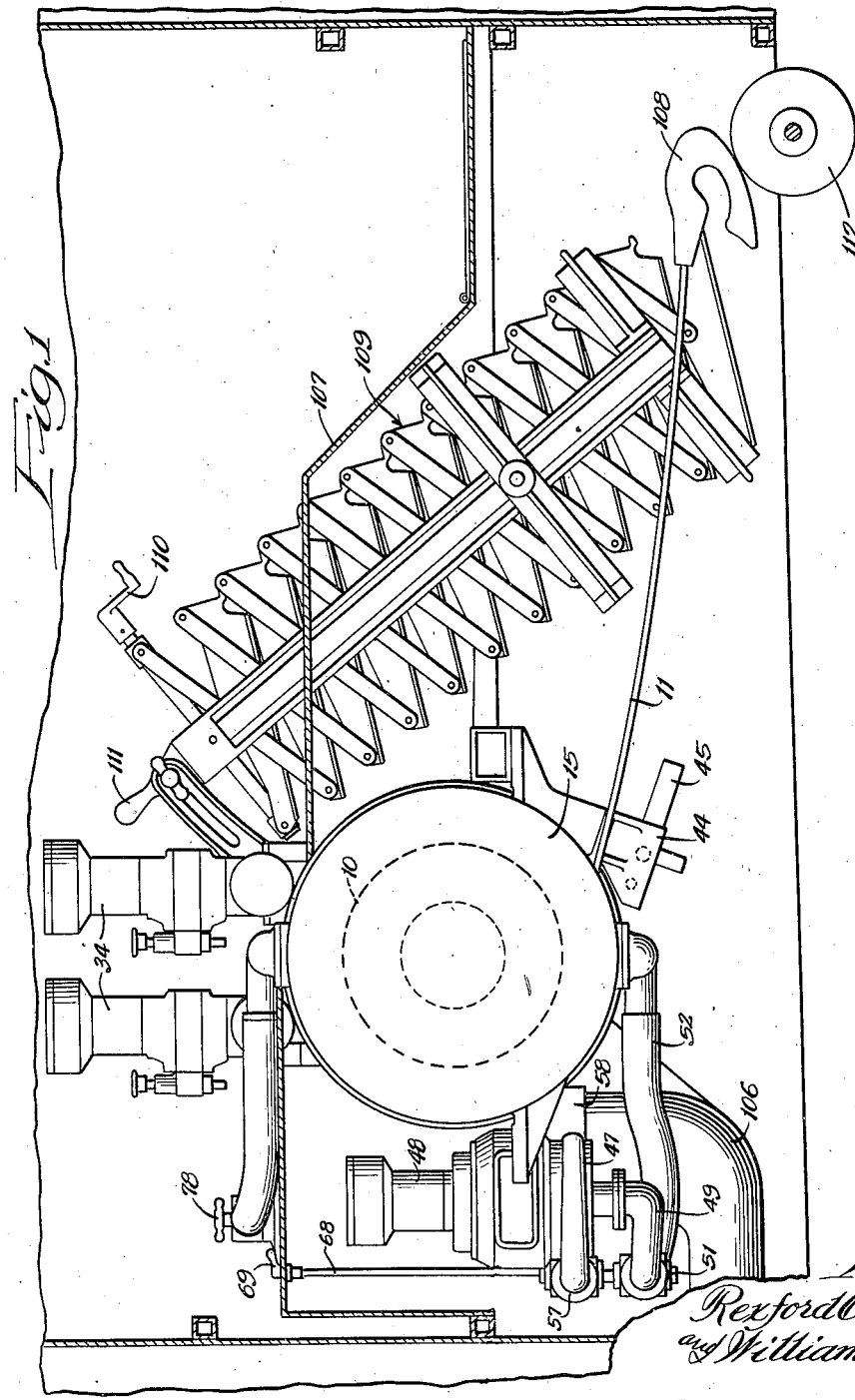
Figure 1 is a partial sectional view with parts in elevation showing the manner of mounting the apparatus in an aircraft.
Figure 5:
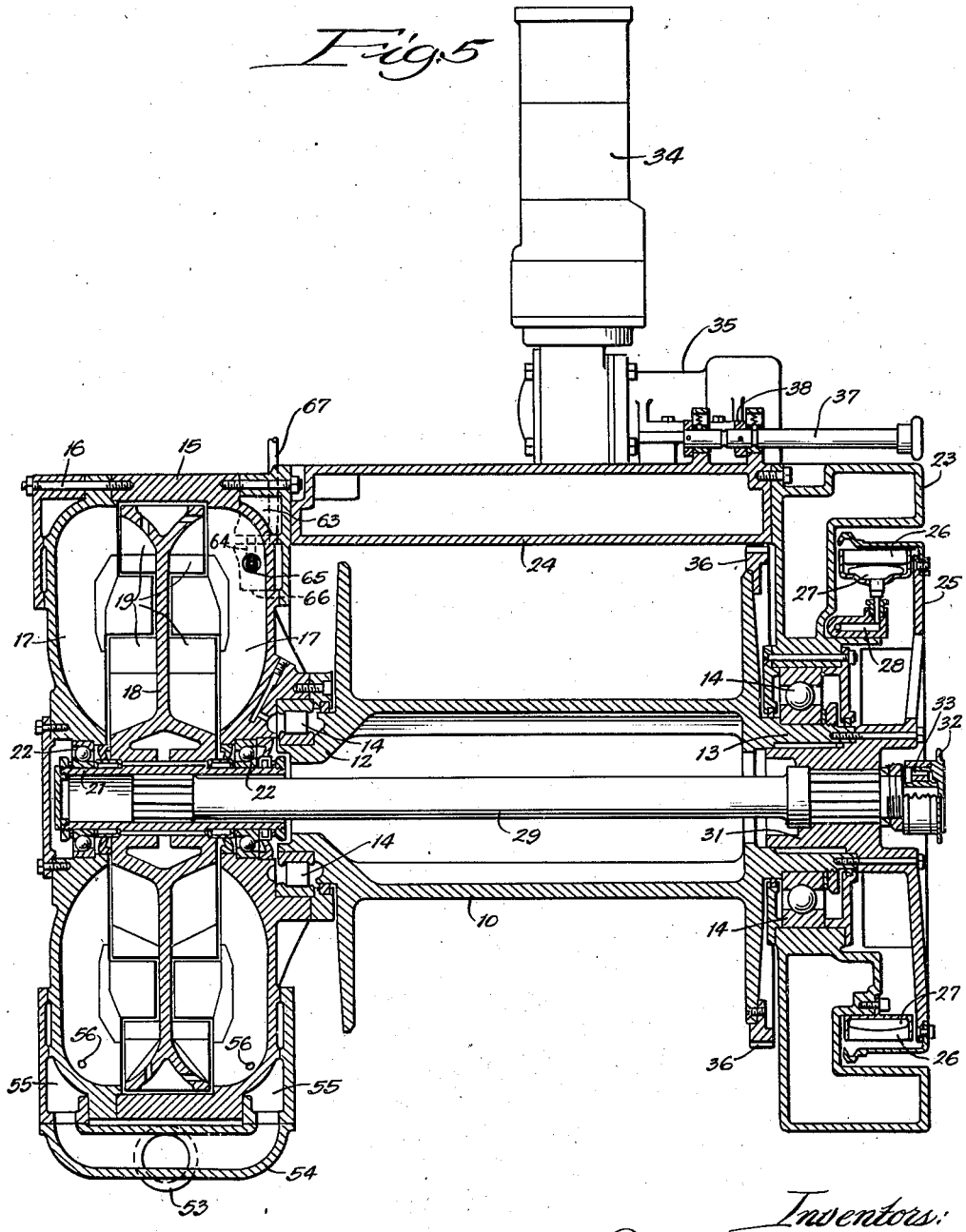
Figure 5 is a section axially through the reel.

Referring to Figure 5, the apparatus as shown comprises a reel 10 adapted to carry a cable 11 as shown in Figure 1 by which the reel is connected to a load. The reel is formed with axially extending hubs 12 and 13 by which it is rotatably supported on bearings 14.

One of the bearings 14 is carried by a flange formed on one end of a casing 15. The casing 15 is made in two parts connected together by bolts 16 and carries on its inner surface sets of vanes 17. A rotatable impeller 18 is mounted in the casing and carries vanes 19 cooperating with the vanes 17 to form a fluid coupling. The construction shown is substantially like that more fully disclosed and claimed in the patent to Carson et al., No. 2,150,539, although it will be understood that other types of couplings could be used if desired. As shown the impeller 18 is supported in the casing on a sleeve 21 carried by bearings 22 so that when the two parts of the casing are connected together with the impeller installed, a complete self-contained unit is formed.

The opposite end bearing 14 is supported in an annular tank or reservoir 23 which is rigidly connected to the casing 15 by a curved tank portion 24 which preferably extends throughout approximately half of the circumference of the tank and casing. Thus the tank and casing are rigidly connected together and form a frame in which the reel is supported.

The reservoir is formed with an axial offset within which is mounted a brake drum 25 connected to the flange 13 on the reel. The drum 25 is adapted to be engaged by brake shoes 26 controlled by a flexible bag or tube 27 to which operating fluid may be supplied through a passage 28. Normally the brake shoes 26 disengage the brake drum 25 and are only moved into engagement therewith when fluid under pressure is supplied to the flexible bag or tube 27.

The impeller 18 is adapted to be connected to the reel by a shaft 29 extending through the hub of the reel. The shaft 29 is splined or keyed to the tube 21 at one end and at its opposite end is similarly splined or keyed to a hub portion 31 on the brake drum 25 which is in turn, directly connected to the flange 13 of the drum. The use of this shaft enables the unit to be assembled easily and provides a certain amount of flexibility in the connection between the impeller and reel to absorb minor shocks. The shaft 29 may carry at its outer end a sprocket 32 connected to the shaft through a one-way clutch 33 for driving a level wind mechanism as will be described hereinafter.

Figure 4:
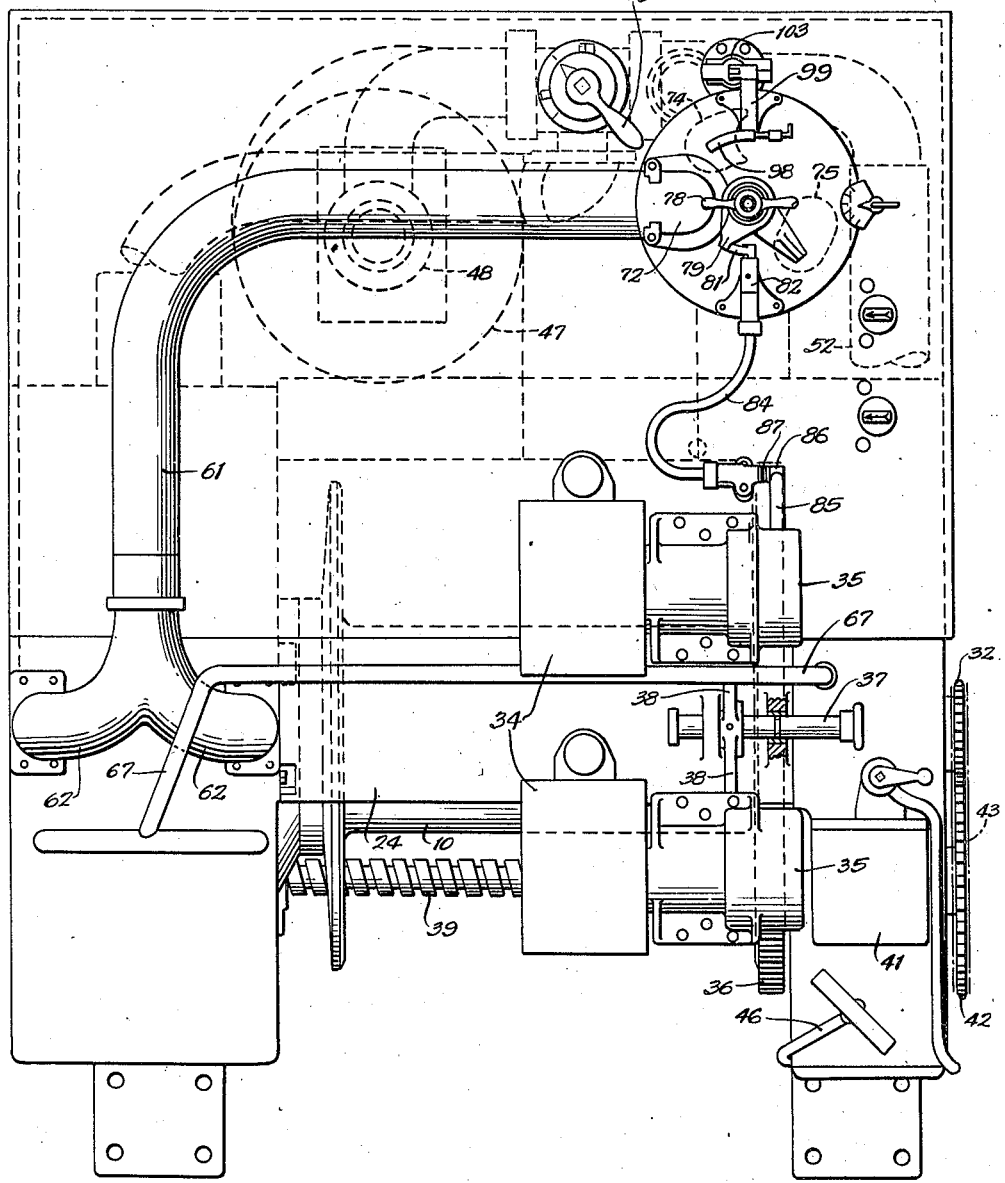
Figure 4 is a plan view.

Cable is adapted to be rewound on the wheel by means of a pair of rewind motors 34 connected through gear boxes 35 to an annular gear 36 on one flange of the reel. The gear boxes are normally in a neutral or idling position and are adapted to be controlled simultaneously by a rod 37 connected through brackets or arms 38 to the two gear boxes. When the rod 37 is in its extended position as shown in Figure 4 the gear boxes do not drive the reel but when this rod is pushed in a gear connection between the motors 34 and the reel is established. Preferably, starting switches for the motors are connected to the rod 37 so that the motors 34 will be energized at the same time the gear connection is established to re-wind cable on the reel.

Figure 3:
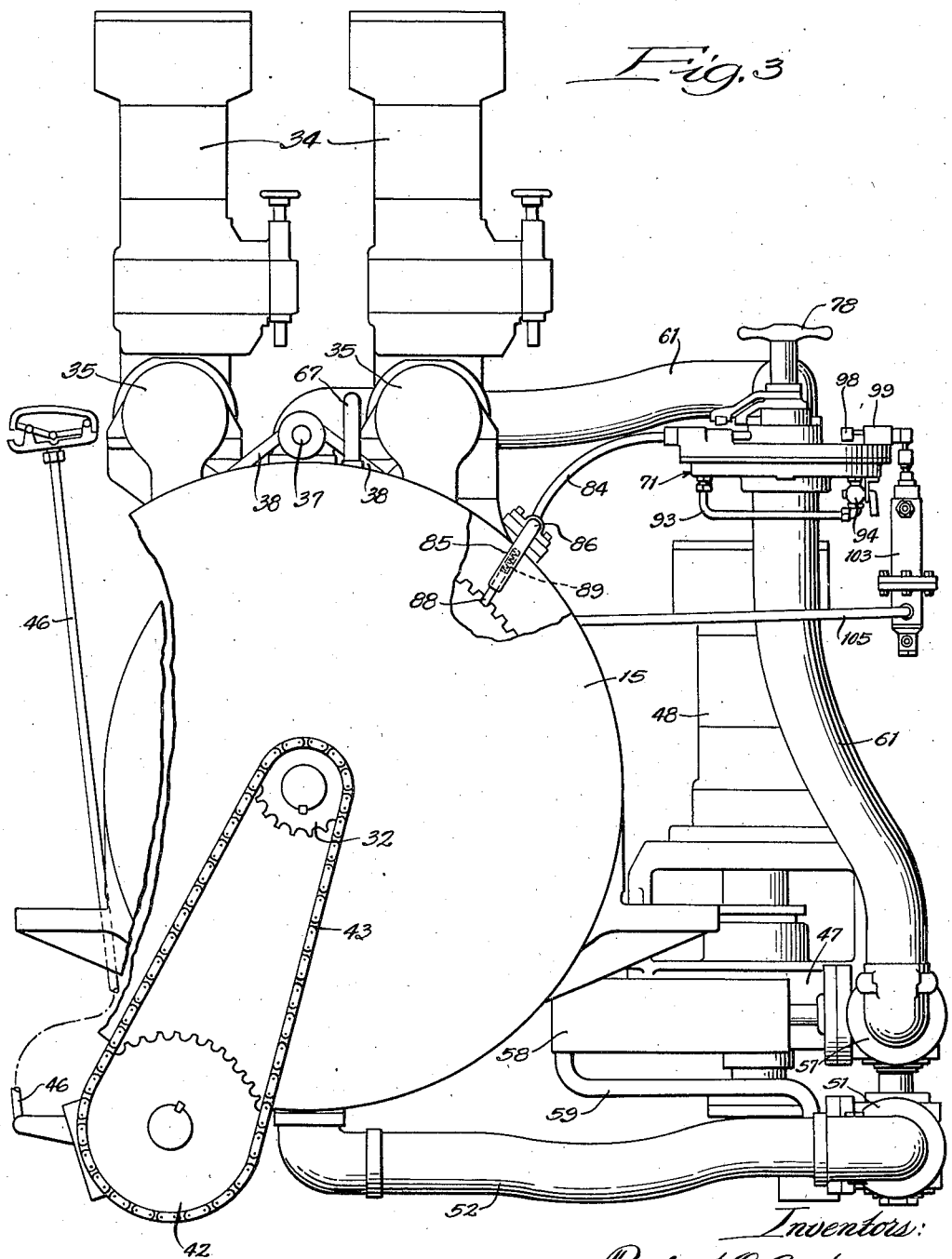
Figure 3 is an end elevation looking from the left of Figure 2.

The level wind mechanism may be of any desired type such, for example, as that shown in the copending application of Arthur Mackmann, Serial No. 491,111, filed on June 17, 1943, now Patent No. 2,396,958, dated March 19, 1946. As best seen in Figures 3 and 4, this mechanism includes a transverse screw 39 connected through a gear box 41 to a sprocket 42 which is driven from the sprocket 32 through a chain 43. A carriage 44 is moved by the screw back and forth across the reel through the operation of the reversible gear box and carries rollers 45 pivoted thereon and adapted to guide the cable onto the reel during rewinding. It will be understood that the one-way clutch 33 drives the sprocket only during re-winding of the cable and idles when cable is being withdrawn from the reel.

Tilting of the guide rollers 45 into operative or inoperative position and movement of the carriage 44 into register with the cable when it is desired to bring the level wind device into operation, are controlled by a handle 46 extending upwardly from the level wind unit for easy control by an operator.

Fluid is supplied to the coupling and is adapted to be removed therefrom by a pump 47 driven by an electric motor 48. The pump inlet is connected through a pipe 49 to a three-way valve 51 having two inlet ports. One of the valve ports is connected through a pipe 52 to the lower part of the tank or reservoir 23 and the other is connected through a pipe 53 to the lower part of the coupling casing 15. As seen in Figure 5, the pipe 53 connects to a manifold 54 opening into annular spaces 55 in the casing 15 which communicates through ports 56 with the interior of the casing.

The outlet of the pump 47 is connected to a similar three-way valve 57 having two outlet ports. One of the ports of the valve 57 is connected to a heat transfer unit such as a radiator 58 for cooling the fluid. The radiator is connected through a small pipe 59 to the pipe 52 which leads to the tank or reservoir. The other port of valve 57 communicates with a pipe 61 leading to the upper part of the casing 15. As shown in Figure 4, the pipe 61 separates into two branches 62 which open into spaces 63 formed in the upper part of the casing 15. The spaces 63 are connected to the interior of the casing to supply fluid thereto through small pipe 64 opening into the interior of the casing through enlarged openings 65 in the walls thereof.

The casing is vented through the openings 65 which communicate with a space 66 in the casing adjacent the upper part thereof. The space 66 is connected to a small vent pipe 67 which extends across the upper part of the apparatus and is connected to the top of the tank or reservoir 23 as shown in Figure 4. Due to this construction, loss of liquid from splashing or from excessive filling of the unit casing is prevented. If liquid supply to the casing is continued after the casing is filled, liquid will be forced through the openings 65 and through the vent tube 67 back into the upper part of the tank or reservoir.

The three-way valves 51 and 57 are simultaneously controlled by an operating rod 68 extending up toward the top of the unit and terminating in a control handle 69. The handle 69 is adapted to be moved between two control positions in one of which the valve 51 connects the pipe 52 to the pump inlet 49 and the valve 57 connects the pump outlet to the pipe 61. In the other control position the valve 51 connects the pipe 53 to the pump inlet 49 and the valve 57 connects the pump outlet to the heat exchanger 58. In the first position, the pump will operate to withdraw fluid from the tank 23 as shown by the solid arrows in Figure 2, and force the liquid into the pipe 61 and eventually into the casing 15 of the hydraulic unit. In the second position, the pump will withdraw liquid through the pipe 53 from the lower part of the casing 15 and force it through the radiator 58 and restricted pipe 59 into the tank as shown by the dotted arrows in Figure 2.

Supply of fluid to the casing 15 of the hydraulic unit is controlled by a valve indicated generally at 71 and which is shown in detail in Figures 6 and 7. The valve includes a pipe portion 72 which is connected in series in the pipe 61 and flow through which is controlled by a rotatable disc 73. As shown in Figure 4 the disc 73 is formed with two circumferentially spaced ports 74 and 75 adapted successively to register with the passage through the pipe section 72. In the initial position as shown in Figure 4, neither port registers with the pipe section but as the disc is turned counterclockwise first the port 74 will register with the pipe and then the port 75.

The disc is adapted to be rotated by a coil spring 76 connected at one end to a shaft 77 which is secured to the disc and at its other end to the valve housing. The shaft 77 extends through the housing and carries a handle 78 through which the valve may be reset. When the valve is moved to the position shown in Figure 4, it is normally held in such position by a latch mechanism including an arm 79 connected to the shaft 77 and engaged by a swingable latch member 81 which is rotatably supported in a bracket 82 on the valve casing. The latch member 81 is carried by a rod 83 in the casing 82 which is connected through a flexible cable 84 to an actuating finger 85. The actuating finger 85 is carried by a rod 86 which is connected to the end of the cable 84 and which is urged in a direction to release the latch 81 by a spring 87. The finger 85 as shown in Figure 3 carries a projecting pin 88 slidable in the finger and urged outwardly therein by a spring 89. The pin 88 is adapted to engage the teeth of the gear 36 on the reel which will hold it in a position in which the latch 81 engages the arm 79. As soon as the reel is turned the finger 85 will be turned to turn the flexible shaft 84 and move the latch 81 out of engagement with the arm 79.

Movement of the disc 73 in response to the spring 76 is controlled by a dashpot formed by a curved passage 91 in the valve casing in which a vane 92 carried by the disc 73 is movable. The passage 91 as best seen in Figure 7, has enlarged portions at its ends providing substantial clearance around the vane 92 and its central portion is of smaller width so that the vane 92 will fit closely therein. The ends of the passage 91 are connected by a pipe 93 having a valve 94 therein by which the restriction in the pipe may be adjusted.

With the dash pot construction the initial movement of the disc is relatively unrestricted while the vane 92 is moving through the enlarged end of the dash pot. During this portion of the movement the port 74 is brought into register with the pipe passage and at the end of this part of the movement the port 74 has just moved out of register with the passage.

When the vane 92 reaches the restricted part of the passage 91, it will cooperate with the passage to form a dash pot, forcing liquid in the passage through the pipe 93. The rate of movement of the disc at this time is controlled by the adjustment of the valve 94 so that any desired time interval may be made to elapse while the vane is travelling through the restricted portion of the passage 91. At this time, a solid part of the disc 73 between the ports 74 and 75 is in register with the pipe passage so that no fluid is supplied to the coupling unit.

When the vane 92 reaches the other enlarged section of the passage 91 it can again move relatively freely so that the disc will turn rapidly to move the port 75 into register with the pipe passage. Stop means are preferably provided to limit rotation of the disc which is stopped with the port 75 in registering position. After one operation of the valve it can be reset by turning the handle 78 to wind the spring 76 and bring the arm 79 back into engagement with the latch 81.

Figure 2:
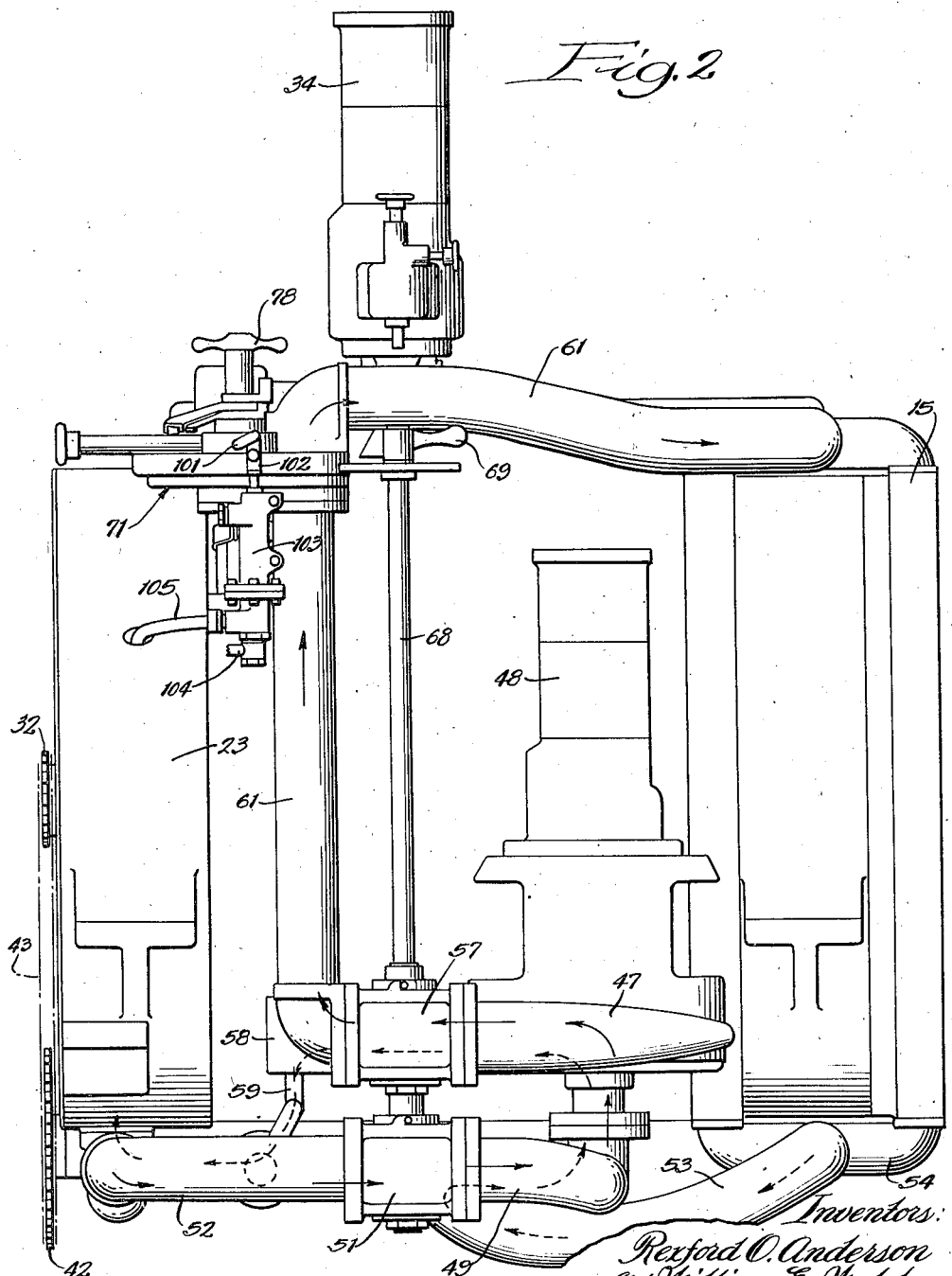
Figure 2 is a side elevation of the apparatus.

The mechanical brake 26 is preferably controlled by the same valve mechanism to engage the brake near the end of the movement of the disc. For this purpose, a second arm 95 is mounted on the shaft 77 preferably being adjustably secured thereto by a threaded collar 96. The arm 95 carries a roller 97 adapted to engage a control lever 98 which is pivotally supported in a bracket 99 on the valve casing (Figure 4). The control lever 98 when engaged by the roller 97 rocks an arm 101 which is connected through a rod 102 with a control valve 103. The control valve controls connection of any suitable source of fluid under pressure such, for example, as the hydraulic control system of the plane with the flexible bag or tube 27. As shown in Figure 2, fluid is supplied to the valve 103 through a pipe 104 and the valve is connected through a pipe 105 with the passage 28 leading to the tube 27. When this valve 103 is opened the mechanical brake will be engaged. When the valve 103 is closed the brake will be disengaged by the usual springs connected to the brake shoes, not shown.

The unit may be mounted in an aircraft as shown, for example, in Figure 1. The aircraft may be provided in its lower side with an opening through which the cable and hook supporting mechanism may project, such opening normally being closed by doors such as the usual bomb bay doors in a bombing plane. In this type of installation the casing 15 and the tank 23 are rigidly mounted in the plane above and in register with the opening. If desired, an air scoop 106 may be provided to assist in drawing air into the opening around the unit where it will flow over the heat exchange device 53 and over the brake and the several motors to assist in cooling them. In order to keep the air out of the plane proper, a cover member 107 is secured in the plane over the unit above which the operator of the unit may stand. The several control members for controlling the three way valves and for resetting and adjusting the control valve preferably project above this member for easy access by the operator so that operation of the unit can be controlled without the necessity of direct access to it. If desired, for convenience various other parts of the installation such as the re-wind motors 34 may extend above the cover.

The cable 11 carried by the reel is connected to a hook 108 which is detachably carried by a pantograph linkage indicated generally at 109 and which may be of the type more particularly described and claimed in our copending application, Serial No. 515,001 filed December 20, 1943, now Patent No. 2,396,948, dated February 5, 1946.

The linkage 109 is controlled by a crank 110 located above the cover 107 and its angle may be regulated by a handle 111 also extending above the cover. When the linkage is extending the cable 11 may pass over one or more guide rollers 112 which may be mounted and arranged as described in our copending application referred to above.

In operation, when it is desired to pick up a load from the ground, the hook 108 may be supported on the linkage 109 and the linkage may be extended through the opening in the bottom of the aircraft. The hook is adapted to engage the usual pickup loop or the like connected to the load so that the cable connects the reel to the load, the cable at this time becoming detached from the link and being guided by the roller 112.

As soon as load is applied to the cable the reel starts turning freely since there is at this time, no liquid in the coupling and the mechanical brake is disengaged. Initial turning movement of the reel swings the control finger 85 counterclockwise to release the latch 81 so that the valve disc 73 can start moving.

It will be understood that the motor 48 driving the pump 47 is in operation prior to engagement of the hook with the load so that fluid under pressure is immediately available to be supplied to the coupling. This arrangement has another advantage since it causes the fluid to be heated slightly and to leak to some extent around the disc 73 into the dash pot passage 91. Thus the fluid in the dash pot will always be heated to some extent so that its temperature variation between successive operations will be minimized. The fluid leaking around the disc 73 eventually finds its way back to a central chamber 113 in the valve casing from which it may be returned to the supply side of the pump through a pipe 114. This arrangement insures a constant small amount of circulation through the valve casing and the dash pot passage while preventing the building up of any pressure or any substantial flow of fluid through the outlet side of the valve.

As soon as the latch 81 is released the disc 73 turns quickly to a position in which the port 74 registers with the valve passage to permit liquid to flow from the pump into the coupling unit. By properly timing the valve motions any desired amount of liquid may be supplied but we prefer to supply sufficient liquid to fill the unit approximately half full before the port 74 moves out of register with the valve passage and interrupts liquid flow.

As soon as liquid is supplied to the unit resistance to unwinding of cable from the reel is applied and the cable starts to pick up the load. The resistance offered by partial filling of the unit is continued during the interval when the vane 92 is moving through the restricted part of the dash pot passage 91 which may be made any desired length. When the vane reaches the other enlarged end of the dash pot passage the port 75 moves into register with the pump passage so that additional fluid is supplied to the unit to fill it substantially completely. Any excess liquid will be forced out through the vent pipe back into the reservoir or tank 23. This increases the resistance offered to unwinding of the cable by the hydraulic unit and substantially stops the rotation of the reel. Thus the major portion of the load is absorbed by the hydraulic unit.

During the final portion of the movement of the valve disc the roller 95 engages the operating lever 98 and turns it to open the valve 103 through the push rod 102. At this time fluid under pressure is supplied to the flexible bag or tube 27 to engage the brake shoes 26 with the brake drum 25. The mechanical brake brings the reel to a complete stop absorbing only the final portion of the applied load and acts as a holding device to hold the reel against further rotation. At this time, the load has been picked up and accelerated to the speed of the pickup aircraft and may be towed by the cable. If it is desired to shorten the distance between the load and towed craft it will be understood that the motors 34 may be operated to re-wind a portion of the cable on the reel.

After completion of a pickup operation the handle 69 is turned to move the valves 51 and 57 to their second described position in which the pump will operate to withdraw liquid from the hydraulic unit and pump it back into the tank 23. Flow of liquid in this direction is through the radiator 58 which serves to cool the liquid heated by the work done thereon in the hydraulic unit. The relatively small pipe 59 restricts the rate of flow through the radiator so that sufficient time is provided to cool the liquid. Upon re-winding the cable on the drum and resetting the valve through the handle 78 the mechanism is reset to perform a second pickup operation.

In some instances where very heavy loads are picked up, we have found that the liquid in the coupling may tend to heat. To avoid excessive heating of the liquid, particularly during the initial operating stage when the coupling is only partially full, a continuous circulation through the coupling may be maintained. A circuit for this purpose is shown in Figure 8, parts therein corresponding to like parts in the preceding figures being indicated by the same reference numerals. In this circuit, the outlet of the pump 47 is connected to one port of the three-way valve 57. The valve 57 is connected through a conduit 115 to the upper end of the coupling 15 and a shut-off valve 116 is provided in the conduit 115. The valve 116 is normally opened by a spring 117 and is adapted to be held closed by a face cam 118 carried by the stem of the valve 71. The valve 57 is also connected through the radiator 58 to the reservoir through the pipe 59 as in the first embodiment. The inlet of the pump 47 is connected by a pipe 119 to one port of the three-way valve 51. The other two ports of this valve are connected by pipe 121 to the reservoir 23 and by pipe 122 to the lower end of the coupling unit. The pipe 122 is so connected to the coupling that when the coupling is rotating, fluid will be forced through the pipe 122 under pressure. For this purpose, the pipe communicates with an enlarged opening 123 in the casing which registers with annular space 124 in the rotor 18. Ports 125 connect the space 124 to the interior of the rotor so that when the rotor is turning liquid will be forced through the ports into the space 124 under pressure.

A branch pipe 126 connects to the pipe 122 between the valve 51 and the coupling and communicates through the control valve 71 with the reservoir 23.

In operation with the coupling empty and the valve 116 held closed by the cam 118, there is no fluid in the casing. As soon as the reel is moved, the valve 71 is tripped as explained above and turns the cam 118 to release the valve 116 which then opens under the influence of the spring 117. The control disc of valve 71 is changed as shown at 73' in Figure 9 to include only a single enlarged port 127. During initial movement of the control valve the port 127 is out of register with the conduit 126 so that no liquid can flow through pipe 126. Thus during the initial stage after valve 116 opens, liquid will be pumped into the coupling partially to fill it but no liquid will be removed from the coupling.

Upon further turning of the disc 73' the port 127 registers with the conduit 126 and at this time liquid can flow from the coupling through the conduits 122 and 126 and the valve 71 back to the reservoir. If the rate of return of liquid is the same as the rate of supply, there will be a constant circulation of liquid through the coupling but the total quantity of liquid in the coupling will be unchanged.

In order to insure that liquid will be withdrawn at the same rate it is supplied, we prefer to make the several conduits of substantially the same size and to equalize the pressure therein. We have found that in operation the pressure created in conduit 122 by the coupling impeller tends to be somewhat higher than the pressure developed by the pump 47. Therefore, to equalize the pressures a small pipe 128 is connected between the conduits 115 and 126. A check valve 129 opening in the direction of the conduit 115 is provided in the pipe 128 to prevent back flow from the conduit 115 to the reservoir. Normally the pressure difference between the conduits 115 and 126 is relatively small so that only a small quantity of liquid will flow through the pipe 128 but this is sufficient to equalize the pressures in the two pipes and to insure that liquid will be withdrawn from the coupling at the same rate it is supplied when the valve 71 is opened.

Upon further movement of the valve disc 73' the conduit 126 will be closed and continued operation of the pump 47 will fill the coupling completely full. Operation of this construction is substantially the same as that of Figures 1 to 7 except that a continuous circulation of liquid is maintained through the coupling during the initial load absorbing stage so that excessive heating of the liquid is prevented.

To drain liquid from the coupling the valves 51 and 57 are turned to connect conduit 122 through the valve 51 to the pump inlet and to connect the pump outlet through the radiator 58 to the reservoir.

While two embodiments of the invention are shown and described in detail herein, it will be understood that these are illustrative only and are not intended as a definition of the scope of the invention, reference being had for that purpose to the appended claims.

What is claimed is:

1. Apparatus for absorbing shock loads comprising a rotatable reel, a cable on the reel adapted to be connected to a load, a hydraulic coupling having a pair of cooperating vaned elements, means connecting one of the elements to the reel, means holding the other element against rotation, a pump operated independently of the reel to supply liquid to the coupling, and control means operated in response to initial movement of the reel to control the supply of liquid to the coupling.

2. Apparatus for absorbing shock loads comprising a rotatable reel, a cable on the reel adapted to be connected to a load, a hydraulic coupling having a pair of cooperating vaned elements, means connecting one of the elements to the reel, means holding the other element against rotation, means to supply fluid to the coupling, and control means operated by initial movement of the reel in a direction to unwind the cable therefrom to initiate the supply of fluid to the coupling.

3. Apparatus for absorbing shock loads comprising a rotatable reel, a cable on the reel adapted to be connected to a load, a hydraulic coupling having a pair of cooperating vaned elements, means connecting one of the elements to the reel, means holding the other element against rotation, means to supply fluid to the coupling, and control means operable automatically quickly to cause the coupling to be partially filled with liquid upon initial unwinding of the cable from the reel and then to maintain the supply of fluid in the coupling substantially constant for a predetermined interval of time and thereafter to cause the coupling to be filled with liquid.

4. Apparatus for absorbing shock loads comprising a rotatable reel, a cable on the reel adapted to be connected to a load, a hydraulic coupling having a pair of cooperating vaned elements, means connecting one of the elements to the reel, means holding the other element against rotation, a mechanical brake connected to the reel, and control means operable first, to supply fluid to the coupling partially to fill it upon initial unwinding of cable from the reel, second, to maintain the amount of fluid in the coupling substantially constant for a predetermined time interval, third, to increase the amount of fluid to the coupling to fill it, and fourth, to engage the mechanical brake.

5. Apparatus for absorbing shock loads comprising a rotatable reel, a cable on the reel adapted to be connected to a load, a hydraulic coupling having a pair of cooperating vaned elements, means connecting one of the elements to the reel, means holding the other element against rotation, a fluid supply pump connected to the coupling, and a control valve in the connection including a movable valve member having ports therein adapted successively to register with the connection as the member is moved, time delay means controlling the rate of movement of the valve member, a spring tending to move the valve member, a latch holding the valve member in its starting position, and means operated by initial withdrawing of cable from the reel to release the latch.

6. Apparatus for absorbing shock loads comprising a rotatable reel, a cable on the reel adapted to be connected to a load, a hydraulic coupling having a pair of cooperating vaned elements, means connecting one of the elements to the reel, means holding the other element against rotation, a fluid supply pump connected to the coupling, and a control valve in the connection including a movable valve member having ports therein adapted successively to register with the connection as the member is moved, time delay means controlling the rate of movement of the valve member, a spring tending to move the valve member, a latch holding the valve member in its starting position, means operated by initial withdrawing of cable from the reel to release the latch, a mechanical brake connected to the reel, and control means for the brake operated by the valve member during the latter part of its movement.

7. Apparatus for absorbing shock loads comprising a rotatable reel, a cable on the reel adapted to be connected to a load, a hydraulic coupling having a pair of cooperating vaned elements, means connecting one of the elements to the reel, means holding the other element against rotation, a pump to supply operating fluid to the coupling, a connection from the pump to the coupling, and a control valve in the connection including a rotatable disc having spaced ports therein, a housing for the disc formed with a curved dash pot chamber wider adjacent its ends than in its central portion, a vane on the disc fitting in the dash pot chamber, a restricted by-pass between the ends of the dash pot chamber, a spring urging the disc in one direction, a latch for holding the disc in its initial position, and means operated by initial unwinding of cable from the reel to release the latch.

8. Apparatus for absorbing shock loads comprising a rotatable reel, a cable on the reel adapted to be connected to a load, a hydraulic coupling having a pair of cooperating vaned elements, means connecting one of the elements to the reel, means holding the other element against rotation, a pump to supply operating fluid to the coupling, a connection from the pump to the coupling, and a control valve in the connection including a rotatable disc having spaced ports therein, a housing for the disc formed with a curved dash pot chamber wider adjacent its ends than in its central portion, a vane on the disc fitting in the dash pot chamber, a restricted by-pass between the ends of the dash pot chamber, a spring urging the disc in one direction, a latch for holding the disc in its initial position, means operated by initial unwinding of cable from the reel to release the latch, a mechanical brake connected to the reel, and control means for the brake including a member movable with the valve disc to engage the brake when the disc reaches a predetermined position.

9. Apparatus for absorbing shock loads comprising a hydraulic coupling having a fixed casing and an impeller rotatable in the casing, a liquid tank spaced from the coupling, a rotatable reel between and supported by the casing and the tank, a cable on the reel, a pump connected to the tank and the casing to pump liquid from one to the other, and a vent tube connecting the upper parts of the casing and reservoir.

10. Apparatus for absorbing shock loads comprising a hydraulic coupling having a fixed casing and an impeller rotatable in the casing, a liquid tank spaced from the coupling, a rotatable reel between and supported by the casing and the tank, cable on the reel, a liquid pump, a first three-way valve connected to the pump outlet, connections from the first three-way valve to the lower part of the tank and the upper part of the casing, a second three-way valve connected to the pump inlet, connections from the second three-way valve to the lower parts of the tank and casing, and means for simultaneously moving the valves.

11. Apparatus for absorbing shock loads comprising a hydraulic coupling having the casing, a liquid tank spaced from the coupling, a rotatable reel between and supported by the casing and the tank, cable on the reel, a liquid pump, a first three-way valve connected to the pump outlet, connections from the first three-way valve to the lower part of the tank and the upper part of the casing, a second three-way valve connected to the pump inlet, connections from the second three-way valve to the lower parts of the tank and casing, means for simultaneously moving the valves, and a control valve in the connection from the first three-way valve to the casing to control the supply of liquid to the casing by the pump.

12. Apparatus for absorbing shock loads comprising a hydraulic coupling having the casing, a liquid tank spaced from the coupling, a rotatable reel between and supported by the casing and the tank, cable on the reel, a liquid pump, a first three-way valve connected to the pump outlet, connections from the first three-way valve to the lower part of the tank and the upper part of the casing, a second three-way valve connected to the pump inlet, connections from the second three-way valve to the lower parts of the tank and casing, means for simultaneously moving the valves, and a heat exchange device in the connection from the first three-way valve to the tank to cool liquid returned from the coupling to the tank.

13. An aerial pickup device adapted to be mounted in an aircraft having an opening in its bottom comprising a reel adapted to be mounted in the aircraft and carrying a cable to extend through the open bottom of the aircraft, a hydraulic coupling having one vaned member mounted in the aircraft and another vaned member connected to the reel, means to supply liquid to the coupling, a cover connected to and spaced above the bottom of the aircraft substantially to close the opening therein and overlying the reel and coupling, and control means for the liquid supply means including parts projecting through the cover for easy access by an operator.

14. An aerial pickup device adapted to be mounted in an aircraft having an opening in its bottom comprising a reel adapted to be mounted in the aircraft and carrying a cable to extend through the open bottom of the aircraft, a hydraulic coupling having one vaned member mounted in the aircraft and another vaned member connected to the reel, means to supply liquid to the coupling, heat exchange means connected to the coupling to cool the liquid, a mechanical brake connected to the reel, a cover connected to the aircraft substantially to close the opening therein and lying over the reel, coupling, brake and heat exchange means whereby they may be cooled by air entering said opening while keeping such air out of the interior of the aircraft, and control means for the liquid supply means and brake including parts above the cover for easy access by an operator.

15. A pick up and arresting device of the character described which comprises a reel containing a length of cable thereon adapted to be unwound as the load is picked up, brake means for progressively increasing the braking action as the unwinding proceeds, additional brake means, control means to apply the additional brake means for terminating further unwinding of said reel after a predetermined time following initiation of the unwinding operation, and manually controlled means for releasing and setting said additional brake means to provide for the automatic application thereof.

16. An aircraft pick up and arresting device which comprises a reel containing a length of cable adapted to be unwound as the load is picked up, hydraulic brake means for controlling the unwinding action of said reel, means operative during the unwinding of said reel for progressively controlling the braking action to maintain a predetermined acceleration of said load, auxiliary friction brake means applicable for holding the reel in fixed unwinding position, and means controlled by said controlling means for causing the application of said auxiliary brake when the rotation of said reel has been substantially terminated under the action of said hydraulic brake.

REXFORD O. ANDERSON.
WILLIAM E. WALSH.

REFERENCES CITED

The following references are of record in the file of this patent:

UNITED STATES PATENTS

| Number | Name | Date |
|---|---|---|
| 990,914 | Shepard | May 2, 1911 |
| 1,113,951 | Box | Oct. 20, 1914 |
| 1,875,600 | Hele-Shaw et al. | Sept. 6, 1932 |
| 1,985,889 | De La Mater et al. | Jan. 1, 1935 |
| 1,992,911 | De La Mater | Feb. 26, 1935 |
| 1,992,912 | De La Mater | Feb. 26, 1935 |
| 2,162,541 | Walker | June 13, 1939 |
| 2,185,491 | Anderson et al. | Jan. 2, 1940 |